US006293677B1

(12) United States Patent
Gallucci

(10) Patent No.: US 6,293,677 B1
(45) Date of Patent: Sep. 25, 2001

(54) DEVICE FOR PROJECTING FLAT ARTICLES ON A WORKING PLANE OF A MACHINE FOR AUTOMATIC CUTTING SUCH FLAT ARTICLES

(75) Inventor: Gianni Gallucci, Monte Urano (IT)

(73) Assignee: Teseo S.p.A. (IT)

( * ) Notice: Subject to any disclaimer, the term of this patent is extended or adjusted under 35 U.S.C. 154(b) by 0 days.

(21) Appl. No.: 09/304,863

(22) Filed: May 4, 1999

(30) Foreign Application Priority Data

May 6, 1998 (IT) .......................................... BO98A0289

(51) Int. Cl.[7] .................................................. G03B 21/26
(52) U.S. Cl. ............................................................ 353/28
(58) Field of Search ............................... 353/11, 78, 80, 353/119, 28; 356/391; 345/10, 11

(56) References Cited

U.S. PATENT DOCUMENTS 4,125,285 * 11/1978 Johnson et al. ....................... 353/28
5,351,196 * 9/1994 Sowar et al. .................... 364/474.24
5,400,095 * 3/1995 Minich et al. ....................... 353/119

FOREIGN PATENT DOCUMENTS 2 564 708 11/1985 (FR) .

* cited by examiner

*Primary Examiner*—Safet Metjahic
*Assistant Examiner*—E P LeRoux
(74) *Attorney, Agent, or Firm*—William J. Sapone; Coleman Sudol Sapone P.C.

(57) ABSTRACT

In a device for projecting flat articles profiles in a machine for cutting these flat articles, a stationary support extends over a working plane of this machine and a pair of adjustable first and second mirrors are connected to the stationary support over the working plane. A projector is mounted on a support rotated alternatively between a first position, in which an image generated by the projector is reflected by the first mirror and projected in a first area of the working plane, and a second position, in which an image generated by the projector is reflected by the second adjustable mirror and projected in a second area of the working plane. The device includes a pneumatic cylinder for driving the support into rotation.

3 Claims, 3 Drawing Sheets

DEVICE FOR PROJECTING FLAT ARTICLES ON A WORKING PLANE OF A MACHINE FOR AUTOMATIC CUTTING SUCH FLAT ARTICLES

FIELD OF THE INVENTION

The present invention relates to machines for automation of production of articles obtained by assembling flat components, and in particular, the present invention concerns a device for projecting real sized profiles of parts on the working plane of a machine for automatic cutting of such parts, mainly of leather or other similar material, used mostly for footwear production.

DESCRIPTION OF THE PRIOR ART

Shoe uppers as heretofore produced are usually formed by a plurality of parts, made of leather or similar material, suitably cut and processed in relation to the shoe model and joined by stitching.

These parts are cut out from bigger pieces of Leather and then possibly decorated by series of holes or slits.

During production of one product series, a great number of parts of various shapes and sizes are produced, since many models of upper are produced and each upper is composed of several parts. Furthermore, every upper model is usually produced in different sizes and colors and, lastly, the parts of a right upper are symmetrical with the parts of a left one.

The parts must be cut with great precision, so as to guarantee high production and constant quality.

Another problem of the part cutting process relates to optimum use of the material.

As it has been already said, the parts are cut out from big pieces of leather of usually irregular shape and always different. Therefore, it is necessary to check and pre-set the number and best arrangement of the parts to be cut out every time, so as to occupy the biggest surface of the leather piece, without putting one component over another and reducing off-cuts.

Thus, it is obvious that the cutting operations are rather complicated and requires use of a lot of resources.

These operations are carried out automatically by complex cutting machines helped by a processor, so as to improve the productivity and reduce use of specialized manpower, as well as operation time.

In particular, the cutting machines have heretofore been provided, as including a big working plane, on which a tools carrying carriage works, moved along cartesian axes on the whole surface of the working plane.

The tools are drills of different thickness for making holes, and in particular, blades for straight and curved cutting, among others.

The carriage is driven by a computerized system associated with the machine according to known techniques of digital definition for the tools paths.

The driving commands are issued in response to the information identifying the profiles for various parts to be cut, which is stored in memory in the above mentioned system.

The arrangement of the profiles can be manually set on a monitor by an operator, or can be automatically optimized by suitable known calculation algorithms after the leather has been arranged on the working plane and after it has scanned in its profile using known techniques.

The cutting machines include also a device for projecting the image displayed on the monitor, which shows the arrangement of the parts profiles on the working plane.

In, this way, the operator can directly see, before each cutting operation, the effective arrangement of the parts to be cut out from the piece of leather spread on the working plane.

This characteristic is very useful and particularly appreciated by users.

The projecting device in its simplest form includes a digital controlled projector connected directly to the machine computer, on an outlet port in parallel to the monitor outlet port, and a suitable frame for supporting the projector in the proper position.

In larger cutting machines, a virtual division of the working plane is very convenient and advantageous, because leather profiles are arranged on one area of the working plane, whereas on another area of this plane, the leather is automatically cut.

In this case, the profile projector moves on the frame between two extreme positions, in which it projects the image of the profiles on the adjacent areas of the working plane, each area substantially corresponding to a half thereof.

The positioning device is formed by a rail, on which a motorized carriage supporting the projector slides horizontally.

The manufacturing of the above mentioned positioning device is very difficult because of the necessary movement precision required and it is also very expensive.

Moreover, using this device, the speed of the projector while changing position is rather low.

On the other hand, another alternative solution, which uses two stationary projectors, would be also expensive and could result in more frequent failures of: the system.

Moreover, it would need additional electronic components, also very expensive, for the machine processing system.

Finally, also the projector supporting frame requires high manufacture and positioning precision, which leads to a further considerable increase of the cutting machine purchase and maintenance cost.

SUMMARY OF THE INVENTION

The present invention was evolved with the general object of providing a device for projecting profiles in one of the above mentioned cutting machines, which reproduces the profile images on two different areas of the working plane using only one projector, without expensive frames and sophisticated positioning devices.

Another object of the present invention is to provide a projecting device which is simple to adjust and maintain, and which is highly reliable and cheap.

These objects are fully obtained, in accordance with the present invention by a device for projecting profiles in a machine for cutting flat articles, said machine including a substantially horizontal working plane, on which at least one piece of leather is spread, driving means for a tools carrying carriage situated over said working plane, processing means, which optimize the arrangement of said flat articles to be cut out of said piece of leather and which consequently guide said tools carrying carriage; the device for projecting profiles also includes:

- a stationary support, that extends over the working plane of this machine;

at least one pair of adjustable mirrors, connected to the stationary support over the working plane;

a projector mounted on support means, which are rotated alternatively between a first working position in which the image generated by said projector is reflected by said first adjustable mirror and projected in a first area of the working plane, and a second working position in which the image generated by said projector is reflected by said second adjustable mirror and projected in a second area of the working plane;

the support means are mounted in the upper part of said machine the device includes also means for driving the support means into rotation.

BRIEF DESCRIPTION OF THE DRAWINGS

The characteristic features of the invention will become more fully apparent from the following detailed description, taken in conjunction with the accompanying drawings, in which.

DESCRIPTION OF THE PREFERRED EMBODIMENT

Figure 1:
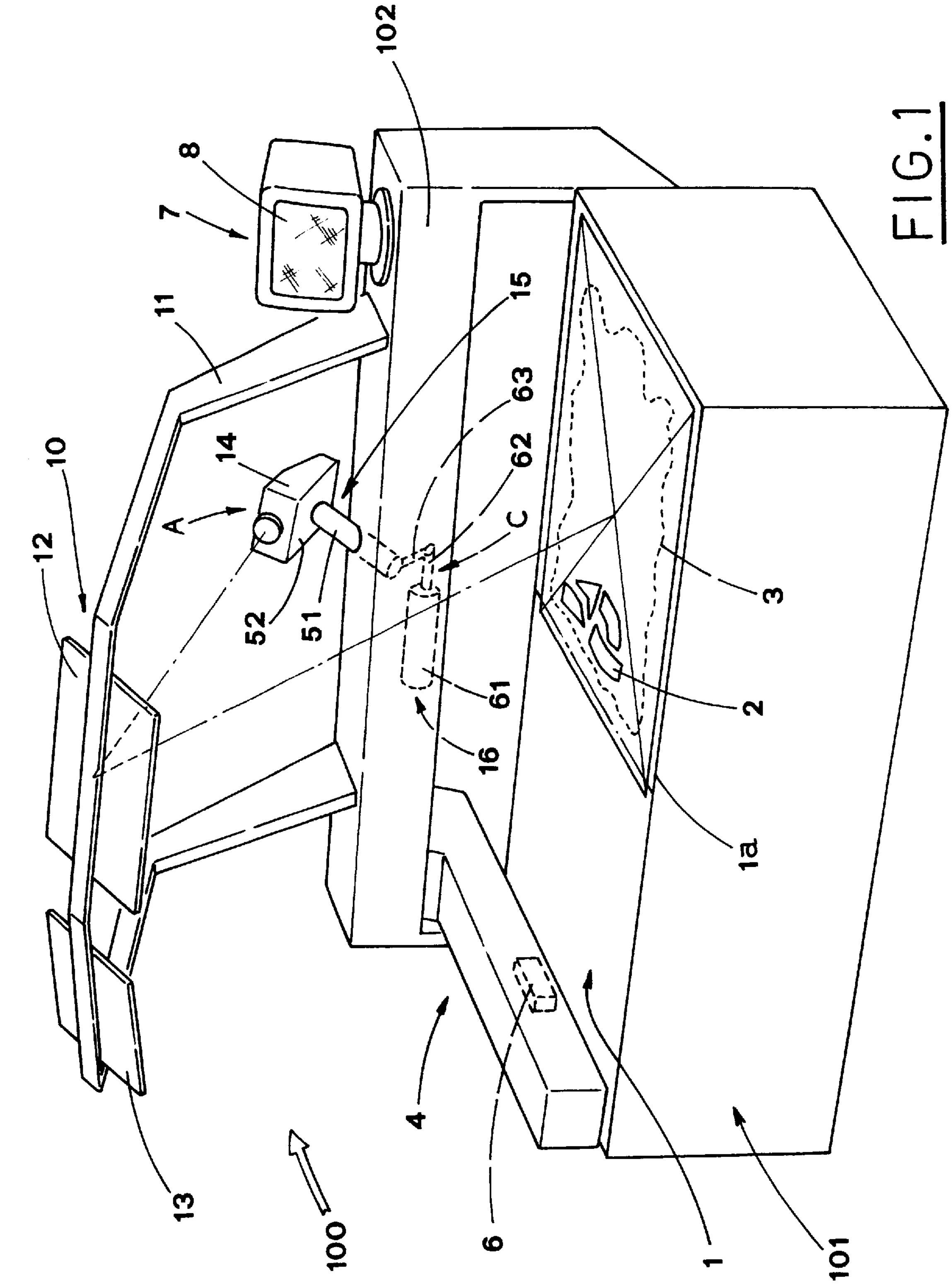
FIGS. 1 and 2 show schematic views of a cutting machine equipped with the projecting device obtained according to the present invention, in two working positions.
Figure 2:
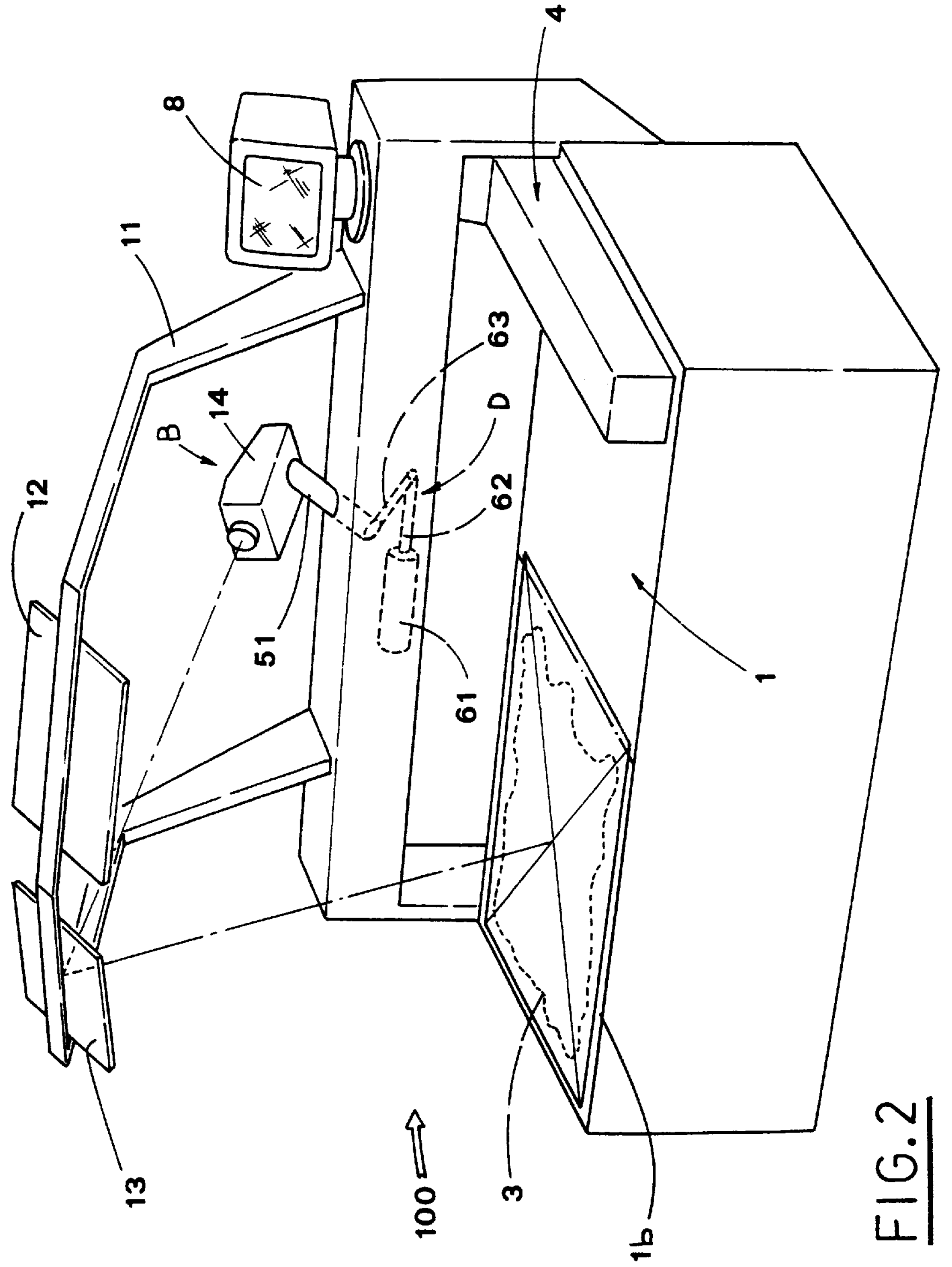

With reference to FIGS. 1 and 2, reference numeral 1 designates a substantially horizontal working plane of a machine 100 for cutting flat articles 2, which are mainly parts of shoe uppers.

One or more pieces of leather 3, indicated with broken line, are put on the working plane 1, to be cut, pierced and so on, in order to obtain the above mentioned flat articles.

This working plane 1 is operationally divided in a first area 1*a* and a second area 1*b*, which are substantially identical and which receive two of the above mentioned pieces of leather 3.

The machine 100 includes also a substantially parallelepiped base 101, whose top portion forms the above mentioned working plane 1, that is located on such a height as to allow an operator to have an easy access to, it.

A Longitudinal horizontal frame member 102, fastened along one of the longer sides of the base 101, supports slidingly in a known way a horizontal driving arm 4 of a tools carrying carriage 6.

The tools carrying carriage 6 slides along this driving arm 4 over the working plane 1, so that it can cover the whole surface thereof for cutting or punching the leather 3 along predetermined profiles and paths.

The machine 100 includes also a processor 7, which controls the machine working cycle, receives the digitized profiles of all possible flat articles 2 to obtain, and receives also a known program for optimizing of the arrangement of the flat articles 2 on the piece of leather 3 and for directing the automatic guide of the tools carrying carriage 6.

The processor 7 is suitable equipped with a monitor 8, which allows the operator to follow and possibly modify all the operations performed by the machine 100.

The device for projecting profiles 10 includes a stationary support 11, rigidly fastened to the longitudinal frame member 102 and extending over the working plane 1 at a suitable height.

A pair of adjustable mirrors 12, 13, first and second, respectively are fastened to the stationary support 11, symmetrically with respect to the working plane 1.

The mirrors position with respect to the working plane 1 is adjustable by adjustment means, known and not shown, e.g. micrometric screws.

A projector 14, connected to the processor 7 for projecting the images of the profiles of the flat articles 2 to be cut, is situated on the longitudinal frame member 102, in a central position with respect to the working plane 1.

The support means 15 include a pin 51, inclined with respect to the working plane 1, and a support plate 52, fastened to the upper end of the pin 51 at a predetermined angle.

The projector 14 is removably fastened to the support plate 52.

The pin 51 is driven into rotation between a first working position A (FIG. 1) and a Second working position B (FIG. 2).

When the pin is in its first working position A, the projector 14 is oriented in such a way that the projected image is reflected by the first mirror 12, which reflects it on the first area 1*a* of the working plane 1.

When the pin is in its second working position B, the projector 14 is oriented in such a way that the projected image is reflected by the second mirror 13, which reflects it on the second area 1*b* of the working plane 1.

Figure 3:
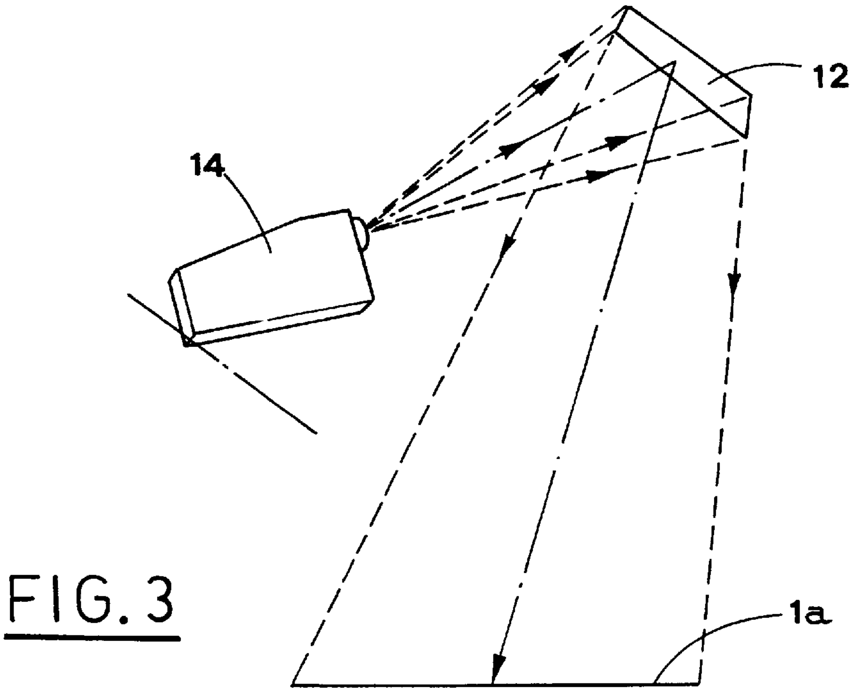
FIG. 3 shows a partial side perspective view of the projecting device, with a schematic geometrical representation of the projected image path.
Figure 4:
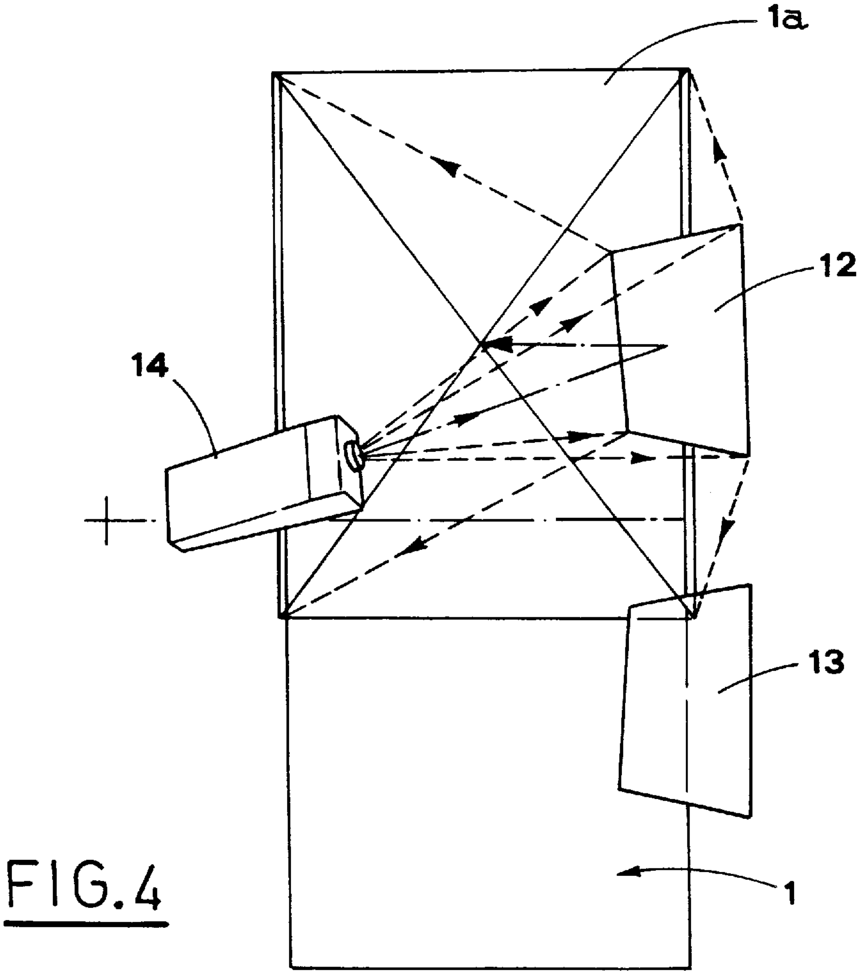
FIG. 4 shows a top view of the device of FIG. 3.

The angular arrangement of the projector 14 and of the first mirror 12 and the second mirror 13, as well as the effective rotation angle of the pin 51 between the first working position A and the second working position B are suitably chosen and set, so that the image of the profiles of the flat articles 2 on the working plane 1 is linear and not deformed (see FIGS. 3 and 4).

Means 16 for driving the support means 15 to rotate are situated inside the longitudinal frame member 102.

In particular, these driving means 16 include a pneumatic cylinder 61, situated horizontally along the longitudinal frame member 102 and acting via an axial stem 62.

An arm 63, hinged to the free end of the axial stem 62, is fastened to the end of the pin 51 opposite to the end, to which the support plate 52 is fastened.

The axial stem 62 and the arm 63 form together a crank mechanism which transforms translation movement of the axial stem in the corresponding rotation movement of the pin 51.

The axial stem 62 works between two extreme positions: a retracted position C (FIG. 1) corresponding to the first working position A of the support means 15, and an advanced position D (FIG. 2) corresponding to the second working position A of those support means 15.

When the processor 7 visualizes in the projector 14 the image corresponding to the optimized, or being optimized, image of the arrangement of the profiles of the flat articles 2 on the piece of leather 3 spread on the first area 1*a* of the working plane 1, the axial stem 62 is in its retracted position C and due to this, the pin 51 is in its first working position A.

Therefore, the image projected by the projector 14 strikes the first mirror 12 and is reflected thereby exactly on the first area 1*a* of the working plane 1.

Therefore, the image of the profiles of the flat articles 2 is displayed exactly on the leather 3 and the operator can verify if it really corresponds to the shape of the leather 3.

After having verified the arrangement correctness and acceptability, the operator gives the processor 7 the cut command and the flat articles 2 are cut out from the piece of leather 3 according to known working cycle of the machine 100.

At this point, the axial stem is brought to the advanced position D (FIG. 2), which causes the pin 51 to rotate up to the second working position B, and consequently, the projector 14 rotation.

In the second working position B, the image projected by the projector strikes the second mirror 13 and is displayed on the second area 1*b* of the working plane 1.

At this point, while the machine is cutting the piece of leather arranged on the first area 1*a* the working plane 1, the operator can put another piece of leather 3 on the second area 1*b* of the working plane 1 and arrange the profiles thereon.

The major advantage of the present invention derives from the fact that it allows to reproduce the image of the flat articles 2 profiles on two different areas of the working plane 1, using only one projector and an extremely simple, cheap and rapid device for positioning this projector.

Another advantage of the present invention results from the fact that the setting and use of the proposed projecting device is particularly simple, and that his device is very reliable.

It is understood that what above has been described as a mere, non limitative example, therefore possible constructive variants remain within the protective scope of the present technical solution, as described above and claimed in the following.

What is claimed is:

1. A machine for cutting flat articles from at least one piece of leather, the machine having a substantially horizontal working plane, on which the piece of leather is spread, a moveable tools carrying carriage situated over the working plane, processing means for selecting an arrangement of said flat articles to be cut out of said piece of leather and for guiding said tools carrying carriage, the improvement comprising;

a stationary support extended over the working plane of the machine;

at least one pair of adjustable mirrors connected to said stationary support and disposed over the working plane;

a projector mounted on support means mounted to the machine; the support means being rotatable from a first working position in which an image generated by said projector is reflected by said first adjustable mirror and projected in a first area of the working plane, and a second working position in which an image generated by said projector is reflected by said second adjustable mirror and projected in a second area of the working plane; and, means for rotating the support means.

2. A machine as in claim 1, wherein said support means include a pin, oriented along an axis inclined with respect to said working plane, and a support plate fastened to an upper end of said pin at a predetermined angle said projector supported on said support plate.

3. A machine as in claim 1, wherein said means for rotation include a pneumatic cylinder having an axial stem, and an arm fastened to a free end of said stem, said stem movable between two positions, a retracted position corresponding to said first working position of said support means, and an advanced position corresponding to said second working position of said support means.

* * * * *